United States Patent
Safai et al.

(10) Patent No.: US 11,054,358 B1
(45) Date of Patent: Jul. 6, 2021

(54) SYSTEMS AND METHODS FOR DETECTION OF SURFACE AND NEAR-SURFACE POROSITY

(71) Applicant: The Boeing Company, Chicago, IL (US)

(72) Inventors: Morteza Safai, Newcastle, WA (US); Gary Ernest Georgeson, Tacoma, WA (US)

(73) Assignee: The Boeing Company, Chicago, IL (US)

(*) Notice: Subject to any disclaimer, the term of this patent is extended or adjusted under 35 U.S.C. 154(b) by 0 days.

(21) Appl. No.: 16/784,204

(22) Filed: Feb. 6, 2020

(51) Int. Cl.
*G01N 15/08* (2006.01)
*G01N 21/47* (2006.01)
*G01N 29/22* (2006.01)
*G01N 29/265* (2006.01)

(52) U.S. Cl.
CPC ........... *G01N 15/088* (2013.01); *G01N 21/47* (2013.01); *G01N 29/225* (2013.01); *G01N 29/265* (2013.01); *G01N 2201/062* (2013.01); *G01N 2201/0683* (2013.01); *G01N 2201/10* (2013.01); *G01N 2291/0231* (2013.01); *G01N 2291/0289* (2013.01); *G01N 2291/101* (2013.01)

(58) Field of Classification Search
CPC .... G01N 15/088; G01N 21/47; G01N 29/225; G01N 29/265; G01N 2291/0289; G01N 2201/0683; G01N 2201/10; G01N 2291/0231; G01N 2201/062; G01N 2291/101
USPC ............. 356/239.7, 239.8, 237.2, 237.3, 364
See application file for complete search history.

(56) References Cited

U.S. PATENT DOCUMENTS

| | | | | |
|---|---|---|---|---|
| 3,826,923 A * | 7/1974 | Trimble | ............... | G01N 21/909 250/559.42 |
| 4,015,127 A * | 3/1977 | Sharkins | ............ | G01B 11/0641 250/341.3 |
| 4,931,657 A * | 6/1990 | Houston | ................ | G01N 21/86 250/225 |
| 5,355,213 A * | 10/1994 | Dotan | ................ | G01N 21/8806 356/124 |
| 5,894,345 A * | 4/1999 | Takamoto | .......... | G01N 21/8903 356/237.1 |
| 6,404,489 B1 * | 6/2002 | Yu | ........................ | G01N 21/958 356/239.1 |
| 6,605,807 B2 | 8/2003 | Safai | | |
| 7,039,485 B2 * | 5/2006 | Engelbart | ............ | B29C 70/386 700/110 |
| 8,120,766 B2 * | 2/2012 | Oshima | .................. | G01N 21/47 356/237.2 |
| 9,217,713 B1 * | 12/2015 | Satai | .................. | G01N 21/8851 |
| 9,234,740 B1 | 1/2016 | Safai et al. | | |
| 9,709,390 B2 * | 7/2017 | Luxen | ................. | G01B 11/303 |
| 10,024,790 B2 * | 7/2018 | Ahner | ............... | G01N 21/4738 |
| 10,078,049 B2 | 9/2018 | Safai et al. | | |

(Continued)

*Primary Examiner* — Roy M Punnoose
(74) *Attorney, Agent, or Firm* — Kolisch Hartwell, P.C.

(57) ABSTRACT

A method of detecting porosity at and near a composite surface is disclosed, including projecting polarized light on a surface of a composite component and filtering out light reflected off of the surface. The method further includes imaging light scattered from inhomogeneities in the composite component, and generating a map of absence of composite material near the composite surface based on scatter intensity detected in the imaging step.

20 Claims, 5 Drawing Sheets

(56) References Cited

U.S. PATENT DOCUMENTS

| | | | |
|---|---|---|---|
| 10,438,341 B2 * | 10/2019 | Torres | G06T 7/001 |
| 2005/0203657 A1 * | 9/2005 | Engelbart | G01N 21/8806 |
| | | | 700/110 |

* cited by examiner

SYSTEMS AND METHODS FOR DETECTION OF SURFACE AND NEAR-SURFACE POROSITY

BACKGROUND

Composite materials are widely used in a variety of applications, including aerospace components. These materials offer improved strength to weight ratios over conventional materials, among many other advantages. Typically, a composite material includes a matrix material such as a resin or epoxy and a reinforcement material such as a fiber mesh or fabric. The matrix and reinforcement materials are combined to produce a composite material with characteristics different from the individual constituent materials.

During manufacture of composite materials, porosity may develop in the matrix material. For instance, bubbles may form or the matrix material may not fully saturate the reinforcement material. Such porosity may be detrimental to the performance of a composite structure, leading to cracking, reduced stiffness, or compromised coatings, for example. Sub-surface porosity is often tested with ultrasonic scanners. However, ultrasonic testing methods are ineffective for surface and near-surface porosity. Instead, surface treatments are applied to all manufactured composites in case of surface porosity, resulting in additional production time, cost, and material weight.

SUMMARY

The present disclosure provides systems, apparatuses, and methods relating to detecting and quantifying surface and near-surface porosity in composite materials. In some examples, a method of detecting porosity at and near a composite surface may include projecting polarized light on a surface of a composite component and filtering out light reflected off of the surface. The method may further include imaging light scattered from inhomogeneities in the composite component, and generating a map of absence of composite material near the composite surface based on scatter intensity detected in the imaging step.

In some examples, a system for detecting porosity in a composite component may include an illumination source, an imaging device, and a processor. The illumination source may be configured to project polarized light on a surface of a composite component, at Brewster's angle. The imaging device may be configured to receive a scatter of light from a sub-surface region of the composite component. The processor may be configured to generate a map of inhomogeneities in the composite component based on scatter intensity detected by the imaging device.

In some examples, a method of detecting surface and near-surface porosity of a composite component may include illuminating a surface of a composite component such that light is incident on the surface at Brewster's angle. The method may further include receiving light from the composite component with a lens oriented at an angle matching the angle of incidence of the light. The method may further include producing an image of a near-surface region of the composite component from the received light with a light sensor.

Features, functions, and advantages may be achieved independently in various examples of the present disclosure, or may be combined in yet other examples, further details of which can be seen with reference to the following description and drawings.

DETAILED DESCRIPTION

Figure 1:
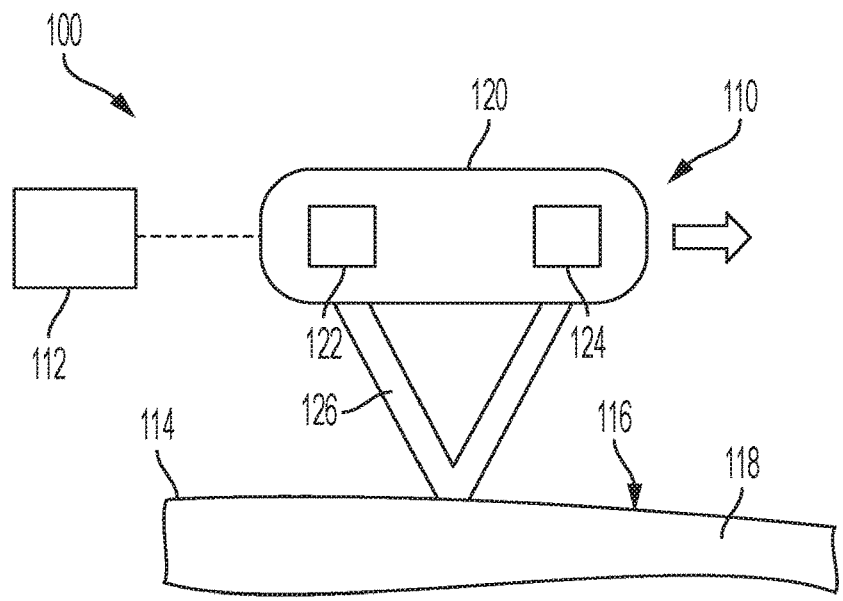
FIG. 1 is a schematic diagram of an illustrative porosity scanning system in accordance with aspects of the present disclosure.

Various aspects and examples of a method of detecting surface and near-surface porosity in composite components, as well as related systems, are described below and illustrated in the associated drawings. Unless otherwise specified, a method of detection in accordance with the present teachings, and/or various components of associated systems may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through D, each of which is labeled accordingly.

Overview In general, a method for detecting surface and near-surface porosity of a composite material includes illuminating and imaging a surface of the material. A scanner appropriate for use in the method includes a light source and a light sensor, connected to a data processing system. The light source and light sensor may form a mobile scanning device, configured to be translated over the surface of the material at a constant standoff distance.

The light source is positioned such that light is incident on the surface at Brewster's angle. That is, the light is incident on the surface such that light reflected off of the surface is s-polarized, or polarized with an electric field perpendicular to the plane of incidence. A polarization filter is applied to eliminate the reflected light. The polarization filter may be applied before the light is incident on the surface to p-polarize the light and eliminate reflections, and/or the polarization filter may be applied prior to receipt by the light sensor to filter out reflected s-polarized light. In this manner, only light scattered off of interfaces or inhomogeneities below the surface of the material may be received by the light sensor.

Data collected by the light sensor as part of a scan may be processed by the data processing system to generate a map of inhomogeneities, voids, and/or absence of material at or near the scanned surface. The data processing system and/or a user may perform further analysis of the generated map and/or collected data to qualitatively and/or quantitatively evaluate porosity of the scanned material.

FIG. 1 is a schematic diagram of an illustrative system 100 for detecting surface and near-surface porosity of a composite material, which may be described as a scanning system. System 100 includes a mobile scanning device 110 connected to a processor 112 and is depicted scanning a composite component 114.

Composite component 114 includes a surface 116 and an interior 118. System 100 is configured to scan a upper region of the component, including surface 116 and a portion of interior 118 proximate the surface, which may be described as a near-surface region of the material. In some contexts, near-surface may be understood to include both a surface and a region of material proximate the surface.

Mobile scanning device 110 includes a housing 120, in which an illumination source 122 and an imaging device 124 are mounted. Light 126 emitted by illumination source 122 is incident on surface 116. A first portion of the light is absorbed by composite component 114, a second portion of the light is reflected off of surface 116, and a third portion of the light is transmitted through surface 116 into interior 118 and then reflected or scattered off of inhomogeneities in the composite material such as reinforcing material or bubbles in the matrix material.

The second portion of light 126 is reflected at an angle matching the angle of incidence of light 126, and may be received but filtered out by imaging device 124. The third portion of light 126 is returned at a range of angles, and imaging device 124 may be configured to maximize capture of the third portion of light. The captured light may be converted by imaging device 124 into data and/or an image of composite component 114. The resulting image and/or data may be communicated by imaging device 124 to processor 112 for further processing and/or analysis.

Illumination source 122 may include any effective source of light with desired properties such as wavelength distribution, polarization, coherence, spatial distribution, and alignment. Some of the desired properties may correspond to a specific composite material to be scanned. For example, a selected wavelength distribution may be centered on a maximum transmission wavelength of the matrix material of the composite. Illumination source 122 may include one or more light sources, including but not limited to lasers, light emitting diodes (LEDs), tungsten-halogen lamps, and arc lamps. Illumination source 122 may further include any lenses, mirrors, filters, or other optical components appropriate to achieve desired illumination properties.

In some examples, illumination source 122 may be configured to selectively alternate between a plurality of discrete wavelength settings, and/or within a continuous band of wavelengths. A selectable wavelength may allow use of scanning system 100 with a variety of composite materials, but may require a more complex and expensive illumination source 122. In some examples, illumination source 122 may produce light with a single wavelength distribution, suitable for a particular composite material. Such a specialized scanning system may be simpler and lower cost, and appropriate for a quality control application in which a single part or composite material will be scanned repeatedly.

Imaging device 124 may include any effective light sensor and objective optical element. For example, the device may include a charge coupled device (CCD) sensor, a complementary metal-oxide semiconductor (CMOS) sensor, or an infrared image sensor. The light sensor may be configured to receive the wavelength of illumination source 122. Commonly available silicon based sensors may be appropriate for wavelengths up to approximately 1.7 micrometers (µm), but for higher wavelengths an infrared (IR) specific sensor may be needed. The objective of the imaging device may include one or more lenses and/or mirrors configured to focus light reflected or scatted from composite component 114 onto the light sensor.

In some examples, imaging device 124 may include an integrated processor, electrically connected to the light sensor. For instance, the imaging device may include an onboard digital processing system with a wireless antenna and communication protocol, configured to receive data from the light sensor and format the data for wireless transmission to processor 112. In another instance, imaging device 124 may be a commercially available or off-the-shelf digital camera or digital imaging system. In some examples, the light sensor of imaging device 124 may be directly connected to processor 112 and collected sensor data may be communicated to the processor without pre-processing by the imaging device.

Processor 112, software run on the processor, and/or hardware connected to the processor may be configured to process, analyze and communicate data received from imaging device 124 to a user of scanning system 100. For example, processor 112 may piece together scan strips obtained from imaging device 124 as scanning device 110 is passed repeatedly over adjacent portions of composite component 114, to generate a map of inhomogeneities in the near-surface region of the scanned portions of the component. The generated map may be displayed to the user for review.

For another example, processor 112 may compare an intensity of light received by imaging device 124 to a selected threshold. When the received intensity passes the selected threshold during a scan, the processor may display a visual alert or produce an audible alert. For another example, processor 112 may apply a trained machine learning system and/or standard image processing software to the data received from imaging device 124 to assign a quantitative porosity score to the scan, and communicate the assigned score to the user.

The data analysis received by the user of scanning system 100 may be used for a variety of purposes. For example, a porosity level determined by the scan may be used to pass or fail a quality control inspection of a manufactured composite part. For another example, the determined porosity level may be used to evaluate a fabrication method by which the composite part was produced.

Aspects of the disclosed method of detecting surface and near-surface porosity and/or scanning system may be embodied as a computer method, computer system, or computer program product. Accordingly, aspects of the method and/or system may take the form of an entirely hardware example, an entirely software example (including firmware, resident software, micro-code, and the like), or an example combining software and hardware aspects, all of which may generally be referred to herein as a "circuit,"

"module," or "system." Furthermore, aspects of the method and/or system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these.

Program code embodied on a computer-readable medium may be transmitted using any appropriate medium, including but not limited to wireless, wireline, optical fiber cable, RF, and/or the like, and/or any suitable combination of these. Computer program code for carrying out operations for aspects of the method of detecting surface and near-surface porosity may be written in one or any combination of programming languages.

Aspects of the method of detecting surface and near-surface porosity are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s). In some examples, machine-readable instructions may be programmed onto a programmable logic device, such as a field programmable gate array (FPGA).

Examples, Components, and Alternatives

The following sections describe selected aspects of exemplary methods of detecting surface and near-surface porosity as well as related systems and/or apparatus. The examples in these sections are intended for illustration and should not be interpreted as limiting the entire scope of the present disclosure. Each section may include one or more distinct examples, and/or contextual or related information, function, and/or structure.

A. Illustrative Detection System

Figure 2:
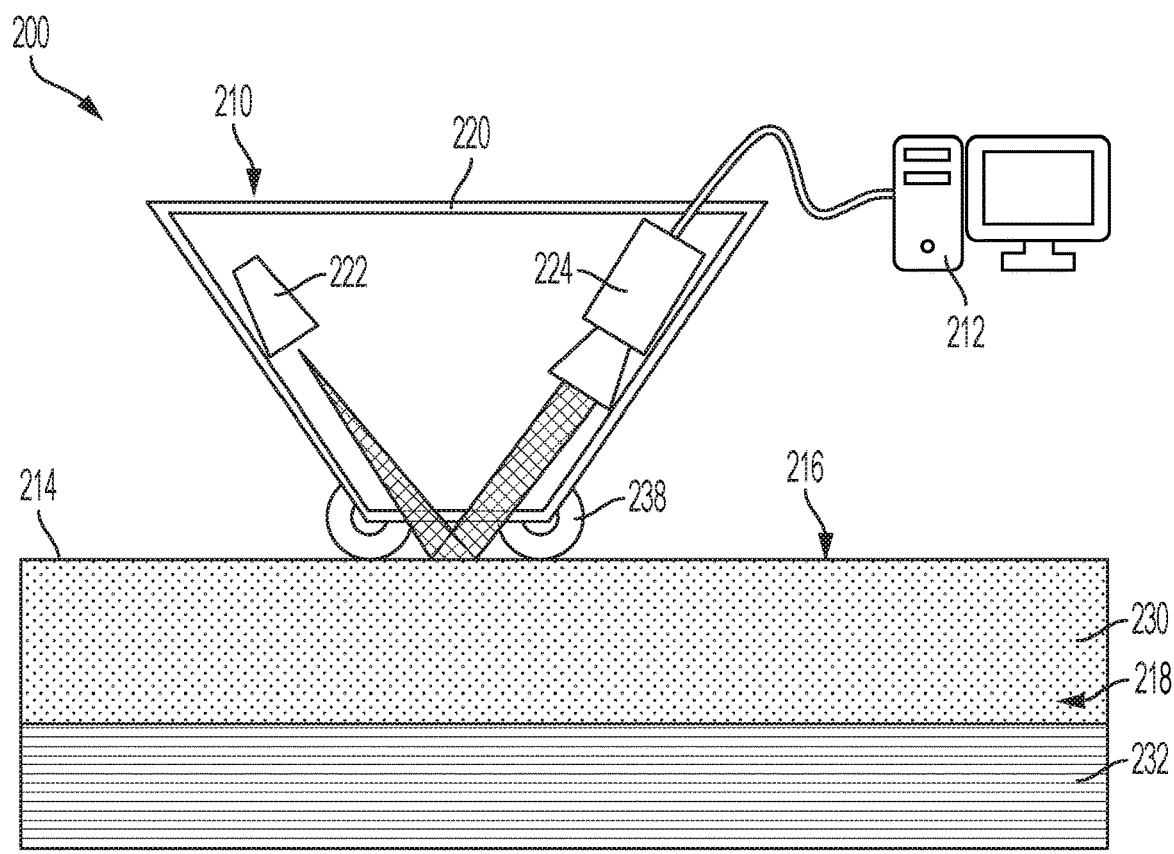
FIG. 2 is a schematic diagram of another illustrative porosity scanning system.
Figure 3:
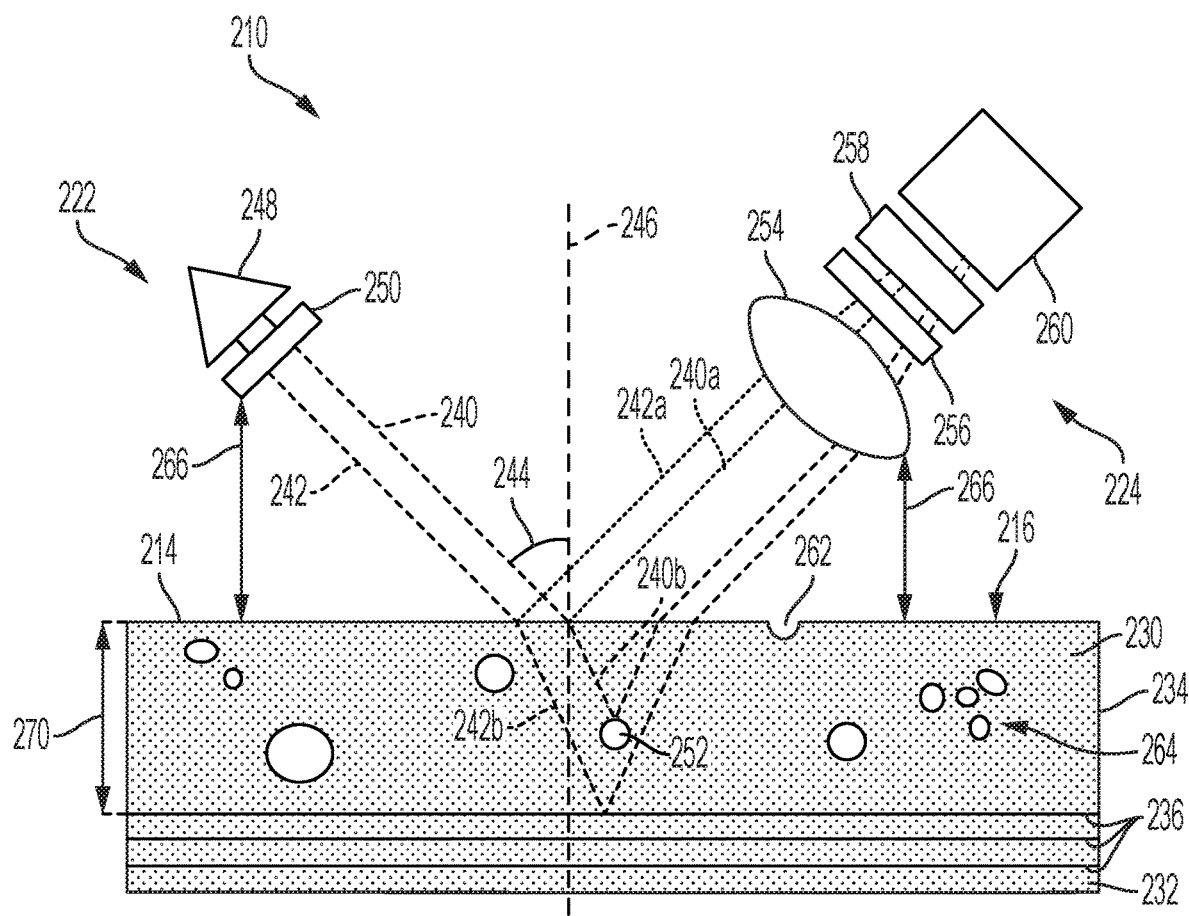
FIG. 3 is a schematic diagram of optical components of the mobile scanning device of FIG. 2.
Figure 4:
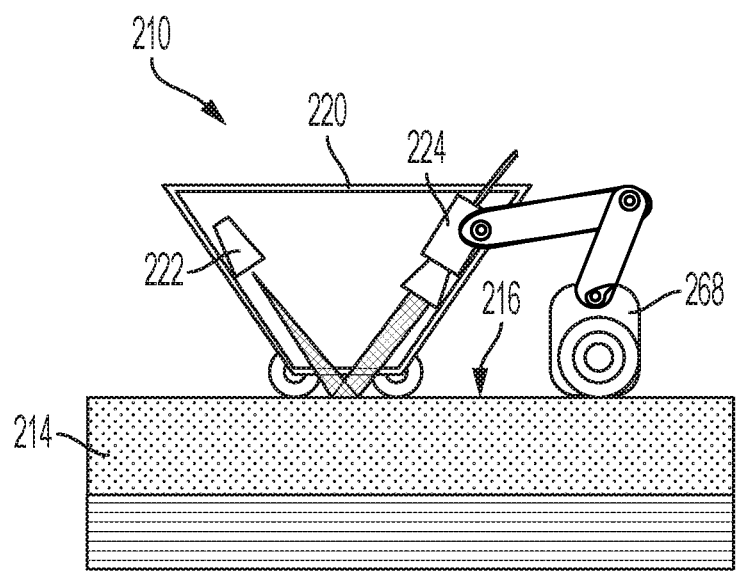
FIG. 4 is a schematic diagram of the mobile scanning device of FIG. 2, with an integrated ultrasonic transducer.

As shown in FIGS. 2-4, this section describes an illustrative surface and near-surface porosity detection system 200. System 200 is an example of a scanning system, as described above. System 200 includes a mobile scanning device 210 connected to a computer 212. A wired connection is depicted, but scanning device 210 may be additionally or alternatively wirelessly connectible to computer 212. Computer 212 may be a laptop, tablet, desktop computer, and/or any digital processing system as described in example C, below.

In FIG. 2, scanning device 210 is depicted scanning a composite material 214. The composite material has an upper surface 216 and an interior 218. Proximate surface 216, interior 218 is divided into a superficial region 230 and a primary region 232. As shown more clearly in FIG. 3, superficial region 230 includes only an epoxy matrix material 234 of composite material 214, while in primary region 232 the matrix material is combined with layers of carbon fiber reinforcement material 236. The near-surface of composite material 214 may be defined as including upper surface 216, superficial region 230, and the interface between the superficial region and primary region 232.

Composite material 214 may be any material of interest. Of particular interest may be composite graphite epoxy and/or glass epoxy (S-glass, E-glass) laminates, skin materials of sandwich structure composites, and/or thermoset epoxies cured between approximately 250 and 350 degrees Fahrenheit such as are commonly used in aerospace applications. Fiber reinforced thermoplastics such as BMI, PEKK, and/or PEEK may also be of interest as use of the materials becomes more common.

Referring again to FIG. 2, scanning device 210 includes a housing 220, a illumination source 222, and an imaging device 224. Illumination source 222 and imaging device 224 are mounted in housing 220 at a fixed angle relative to one another. Housing 220 includes an opening or transparent view-window at a lower end to allow light to pass between illumination source 222, surface 216, and imaging device 224.

Housing 220 is configured to allow illumination source 222 and imaging device 224 to be translated over surface 216, while maintaining a constant standoff distance and angle relative to the surface. In FIG. 2, surface 216 is depicted as planar, but scanning device 210 may be used on curved and/or stepped surfaces. Scanning of irregular surfaces may be possible, but with reduced scan quality. In general, discussion herein of angles or lines relative to surface 216 may be understood to refer to a line tangent the surface for curved surfaces.

Housing 220 may be configured for manual operation, or automated operation as discussed in more detail in example B, below. In the present example, housing 220 includes wheels 238. Wheels 238 rest on and roll over surface 216, as scanning device 210 is translated over the surface. The wheels may both maintain the desired standoff distance and facilitate smooth and consistent movement of the scanning device. In some examples, wheels 238 may be adjustable to allow changes in the standoff distance. For instance, the standoff distance may be changed to alter the angle of incidence of light from illumination source 222, to achieve Brewster's angle for a different composite material, as described further with reference to FIG. 3, below.

In some examples, wheels 238 may include or may be operatively connected to an encoder wheel or rotary encoder. The motion recorded by the encoder may be combined with data from imaging device 224 by computer 212 to accurately produce a map of composite material 214.

FIG. 3 is a schematic diagram of operation of scanning device 210, detecting porosity at a location on composite material 214. A full scan of the composite material may comprise a similar image capture at each location on the material. Depicted in FIG. 3 are a first ray 240 and a second ray 242 emitted by illumination source 222. Each ray has an angle of incidence 244 on surface 216, relative to a normal line 246 at the point of incidence. In an ideal case, all emitted light may have the same angel of incidence, but for most illumination sources, angle of incidence 244 may vary slightly over the illuminated area on surface 216. In FIG. 3, angle of incidence 244 and normal line 246 are each depicted only for first ray 240.

Illumination source 222 includes a light source of one or more LEDs 248 and a polarizing filter 250. LEDs 248 emit light at a maximum or high transmission wavelength of epoxy 234. For common composite material epoxies or resins, a maximum transmission wavelength may be found in the near-infrared range of approximately 0.75 to 1.4 μm. For some epoxies or other composite matrix materials, a maximum or high transmission wavelength may be found in the IR range of approximately 0.75 to 1000 μm. Use of LEDs in illumination source 222 may provide a cost-effective light source for the detection system, with minimal heat generation. A mirrored laser may offer greater coherence, for an optimal signal but may not be necessary to effectively detect near-surface porosity in composite material 214. Quartz glass may be used in the illumination source and/or imaging device 224 for wide spectra response. In some examples, a sapphire coating may be used for improved durability.

Polarizing filter 250 is configured to transmit p-polarized light. That is, the light transmitted by the filter has an electric field parallel to the plane of incidence on surface 216, and at an angle relative to the surface. Therefore, both first ray 240 and second ray 242 are p-polarized when incident on surface 216. In the present example, illumination source 222 produces polarized light with an unpolarized light source and polarization filter 250. In some examples, the light source may produce polarized light.

Illumination source 222 is oriented relative to surface 216 such that angle of incidence 244 is Brewster's angle. That is, where the angle of incidence is $\theta$, $n_1$ is the index of refraction of the medium in which the scan is performed and $n_2$ is the index of refraction of epoxy 234, $$\theta = \arctan\left(\frac{n_2}{n_1}\right).$$

In the present example, the scan is performed in atmospheric air. In some examples, the scan may be performed in vacuum or other sterile or isolated conditions.

Illumination source 222 and imaging device 224 are each maintained at a standoff distance 266 from surface 216. The illumination source and imaging device are also maintained at consistent angles relative to one another. Imaging device 224 may be described as focused on the illuminated area of surface 216. In some examples, the standoff distances 266 and/or angles of the illumination source and/or the imaging device may be adjustable, to allow use of scanning device 210 with composite materials having matrix materials with different indexes of refraction, resulting in different Brewster's angles. Smaller standoff distances may allow use of smaller components for illumination source 222 and/or imaging device 224. Effective maintenance of a consistent standoff distance throughout a scan may be important to the scan's quality.

Consider first ray 240, as shown in FIG. 3. When incident on surface 216, the ray is split into a reflected component 240a and a transmitted component 240b. According to the law of reflection, reflected component 240a is reflected at an angle equal to angle of incidence 244. Imaging device 224 is aligned along the reflected angle, to image the point of incidence of first ray 240 and capturing any reflected light.

Because angle of incidence 244 is Brewster's angle, only s-polarized light in first ray 240 will be reflected as component 240a. However, first ray 240 is p-polarized by polarizing filter 250. Therefore, in an ideal case no light will be reflected. However, given practical conditions such as the efficiency of polarizing filter 250 and variations from planarity of surface 216, a small amount of light will be reflected as component 240a.

Transmitted component 240b of first ray 240 will continue from the point of incidence on surface 216 until either being absorbed by epoxy 234 or encountering an inhomogeneity in the epoxy. In the depicted example, ray 240 is scattered off an interface between epoxy 234 and a bubble 252 of trapped air. Transmitted component 240b is returned toward imaging device 224. Some portion of transmitted component 240b is transmitted into bubble 252, and a further portion reflected back into epoxy 234 at surface 216. These components are not depicted, as the light will be absorbed by the matrix material. The remainder of transmitted component 240b is collected by imaging device 224.

Scanning device 210 may be configured to detect porosity and/or voids such as bubble 252 within a desired size range and/or above a selected threshold size. For example, the scanning device may be configured to detect porosity bubbles between 0.1 and 1 millimeters (mm). For another example, the scanning device may be configured to detect bubbles as large as 5 mm or more, which may be described as voids. In some examples, scanning system 200 may be configured to detect a percentage of porosity over a selected area. For instance, the scanning system may be configured to consistenly detect one percent porosity. Such configuration may allow detection and analysis of confluence of multiple bubbles independent of bubble size.

Consider second ray 242. Similarly to first ray 240, the second ray is split into a small s-polarized reflected component 242a and a p-polarized transmitted component 242b. The transmitted component encounters no inhomogeneities in epoxy 234 of superficial region 230, but is scattered by a layer of carbon fibers 236 at the interface with primary region 232 of composite material 214.

Similarly to transmitted component 240b of first ray 240, some portion of transmitted component of 242b of second ray 242 is absorbed by the carbon fiber and reflected back into epoxy 234 at surface 216. The remainder of transmitted component 242b is collected by imaging device 224.

Superficial region 230 of has a thickness 270. In the present example, the superficial region includes a couple of millimeters of epoxy 234. Depending on the transmission coefficient of epoxy 234 for the wavelength of the ray and thickness 270, second ray 242 may be entirely absorbed by epoxy 234. Appearance of carbon fibers 236 in a resulting image may therefore indicate good scan resolution, but may require adjustment of scan parameters to eliminate the carbon fibers from the scan.

In general, porosity of interest may be disposed above the layer of fibers. To detect porosity below a layer of reinforcing fiber, a wavelength of light may be selected which is substantially transmitted by the fiber material. Feasibility of such scanning may depend on the overlap in wavelength transmission between the matrix and reinforcing fiber materials.

Imaging device 224 includes an objective lens 254, a polarizing filter 256, a Wollaston prism 258, and a CCD sensor 260. Transmitted components 240b, 242b and reflected components 240a, 242a of the first and second rays are collected and focused by objective lens 254. The lens may be configured and positioned to focus an image of surface 216 and superficial region 230 of composite material 214 on CCD sensor 260. In some examples, objective lens 254 may include a plurality of lenses, mirrors, and/or other optical components. In some examples, a CMOS, IR, or other type of light sensor may be used in addition to or in place of the CCD sensor.

Polarizing filter 256 and Wollaston prism 258 are configured to filter out reflected components 240a, 240b. That is, the filter and prism are configured to filter out s-polarized light and transmit p-polarized light. In some examples, polarizing filter 256 alone may be sufficient to filter out the reflected light. The Wollaston prism may serve as a backup to the polarizing filter, to minimize or eliminate leakage of reflected light to CCD sensor 260. In some examples, Wollaston prism 258 may be replaced with another polarizing filter, or other component configured to filter out s-polarized light.

Polarizing filter 256, Wollaston prism 258, and objective lens 254 may be positioned in any order between CCD sensor 260 and surface 216. The depicted order may serve to protect the polarizing filter and Wollaston prism from wear and tear during typical use, as the objective lens may be less expensive and more easily replaceable.

Ideally, only transmitted components 240b, 242b will be received by CCD sensor 260. In other words, only light scattered off of surface and near-surface inhomogeneities 264 of composite material 214 will be imaged by the sensor. Inhomogeneities 264 may include voids or trapped gases in epoxy 234 such as bubble 252, inconsistencies in the density of epoxy 234, foreign material in the epoxy, reinforcement material such as carbon fibers 236, and surface imperfections such as surface void 262.

In practice, some light reflected from surface 216 may be received by CCD sensor 260. However, the intensity of the reflected light may be significantly less than light scattered off of inhomogeneities 264, and may therefore not impede formation of an effective image of the near-surface of the composite material. Similarly, some light may be scattered by carbon fibers 236 but the scan may be calibrated such that the intensity is sufficiently low as to limit or eliminate interference in porosity detection.

The intensity of light forming the image may also be significantly less than the intensity of light emitted by LEDs 248, due to absorption by epoxy 234 and scattering outside of the field of view of objective lens 254. Therefore, a bright light source may be used with a sensitive light sensor to produce an effective image.

Scanning device 210 may also be configured to eliminate stray light. For example, all optical components of illumination source 222 and imaging device 224 may be coated with a narrow bandpass antireflection filter allowing a limited range of wavelength transmission. For another example, a dichroic filter may be positioned between objective lens 254 and polarization filter 256.

Scanning device 210 may image a small area of surface 216 at any one time, but may quickly and efficiently scan a large area of composite material 214 by translating over the surface. That is, objective lens 254 may have a small field of view, but an image of a large area of the near-surface region of composite material 214 may be captured by moving scanning device 210 over the material. For example, objective lens 254 may have a field of view of less than approximately ten inches square, or as small as one centimeter square, but scanning device 210 may be used to scan the surface of components as large as or larger than a composite aircraft wing skin.

Referring again to FIG. 2, data from CCD sensor 260 may be communicated to computer 212 for processing. An image strip may be formed each time scanning device 210 is translated over surface 216. The plurality of image strips may then be stitched together or combined into a comprehensive image by the computer according to positional data encoded during the scan. Such a comprehensive image may be referred to as a porosity map or a map of surface and near-surface inhomogeneities of composite material 214.

On the map, homogeneous areas of epoxy may appear as a dark background, with inhomogeneities showing as bright spots. Where penetration of light into the composite material is good, reinforcement material in primary region 232 may show up as a pattern on the map. Software on computer 212 and/or a user may evaluate the prevalence of bright spots and/or regions on the map to determine the extent of porosity.

FIG. 4 depicts another advantageous version of mobile scanning device 210, configured to scan surface, near-surface, and sub-surface porosity. An ultrasound transducer 268 is mounted to housing 220, and configured for use in a typical method for stress wave testing of composite material porosity.

Transducer 268 may be configured for direct pulse echo scanning. In some examples, the transducer may be mounted on the axle of a wheel. Transducer 268 may contact surface 216 or be spaced from the surface. For example, the transducer may contact the surface through a couplant for traditional pitch-catch scanning. For another example, non-contact laser ultrasound or an airborne ultrasonic testing array may be used. Scanning of composite material 214 for near-surface and sub-surface porosity may be performed concurrently and/or independently. That is, illumination source 222 and transducer 268 may both be in operation during a single pass of scanning device 210 over the material, or the illumination source may be used in a first pass and the transducer may be used in a second pass over the same area of the material. A scan direction may be selected according to relative positioning of illumination source 222 and transducer 268. For example, scanning device 210 may be moved to the left as depicted in FIG. 4, such that a particular region of composite material 214 is scanned first by illumination source 222 and second by transducer 268.

In examples where a coupling medium is used, a scanning direction may be selected to minimize interference with near-surface porosity detection by the coupling medium. Even in examples where vacuum coupling or direct contact is used, residue such as condensation droplets may be left by transducer 268. Therefore, a scanning direction in which illumination source 222 precedes transducer 268 may be preferable.

Transducer 268 may be in communication with computer 212 (see FIG. 2), in communication with another digital processing system, and/or include an integrated digital processing system. Software and/or processing methods known to those skilled in the art of ultrasound porosity testing may be used. In some examples, raw or processed data from an ultrasound scan may be combined with raw or processed data from imaging device 224 to create a full porosity profile of composite material 214.

Other in-depth porosity scanning techniques may additionally or alternatively be combined with scanning device 210 for full porosity profile generation. For example, infrared thermography may be used, or detection of attenuation and/or velocity change of Terahertz or microwave radiation through porosity may be used.

B. Illustrative Mobile Scanning Devices

Figure 5:
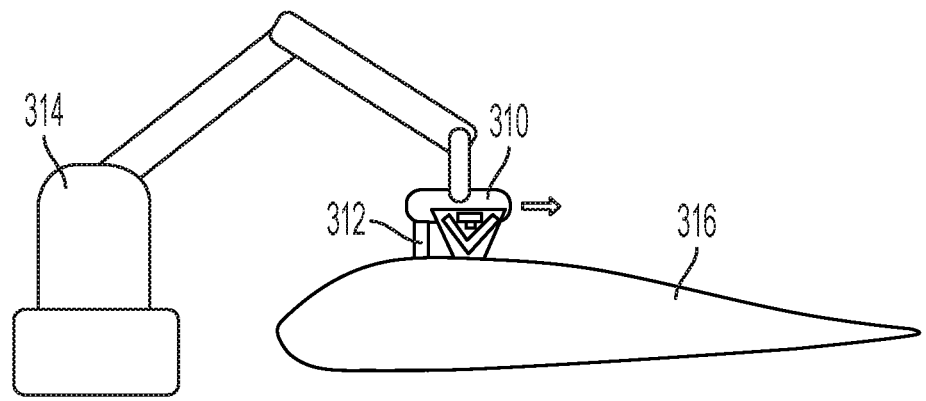
FIG. 5 is a schematic diagram of an illustrative robotic arm-mounted mobile scanning device.
Figure 6:
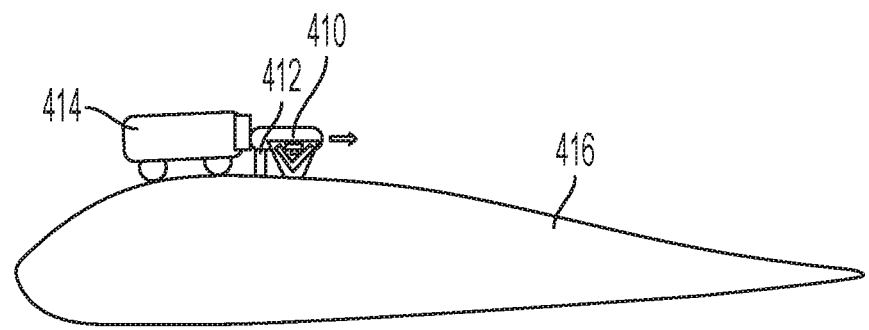
FIG. 6 is a schematic diagram of an illustrative crawler-mounted mobile scanning device.

As shown in FIGS. 5-6, this section describes two illustrative mobile scanning devices 310 and 410. Scanning devices 310 and 410 are examples of a scanning device as described above. Each of scanning devices 310 and 410 includes an illumination source, imaging device and housing as described above with reference to devices 110 and 210.

Each scanning device 310, 410 further includes a standoff mechanism 312, 412. Standoffs 312 and 412 may be the same or different, and may include any effective structure, indicator, sensor, or other mechanism. For example, one or both standoffs may include wheels such as wheels 238 described above. For another example, one or both standoffs may include a laser distance sensor in communication with a logic controller programmed to adjust the standoff distance as measured by the laser distance sensor.

Referring first to FIG. 5, scanning device 310 is mounted on a robotic arm 314. The robotic arm is configured to pass mobile scanning device 310 over the surface of an aircraft wing skin 316. Robotic arm 314 may include a four or six-axis articulated arm, a cartesian arm, or any other effective design. For example, a KUKA industrial robotic arm may be used. In some examples, robotic arm 314 may be adapted from an existing ultrasonic inspection robot, or robot design, by exchanging the existing ultrasonic testing head with scanning device 310. In some examples, scanning device 310 may be added to an ultrasonic inspection robot for concurrent use with the existing ultrasonic transducer.

Robotic arm 314 may be controlled by a data processing system, which may also be in communication with mobile scanning device 310. In some examples, the data processing system may combine positional data from an encoder or encoders of robotic arm 314 with image data captured by scanning device 310 to create a map of surface and near-surface porosity in wing skin 216.

Referring now to FIG. 6, scanning device 410 is mounted on a vehicle or crawler 414. The crawler is configured to pass mobile scanning device 410 over the surface of an aircraft wing skin 416. Crawler 414 may be an autonomous vehicle, a remotely controlled vehicle, a robot, and/or any system configured to move over the surface of wing skin 416 independent of external mechanical support. For example, crawler 414 may be a Remotely Operated Vacuum Enable Robot (ROVER). In some examples, crawler 414 may maintain scanning device 410 at a constant standoff distance from wing skin 416 without need for standoff mechanism 412.

Crawler 414 may be in communication with an external data processing system during scanning operations, and/or may return to a docking station or interface at the conclusion of a scan to exchange data. In some examples, crawler 414 and/or mobile scanning device 410 may include internal data storage appropriate to store data from one or more scans.

Each of robotic arm 314 with mobile scanning device 310 and crawler 414 with mobile scanning device 410 may allow automatic scanning of composite components such as wing skins 316, 416. Specifications of the component and desired scan criteria may be provided to a controller of the scanning system to achieve consistent scanning and/or scans in compliance with inspection requirements or standards. Criteria may include, but are not limited to scan speed, component coverage, collected data density, and optical quality. Such automated scanning may be ideal for quality control operations in high capacity manufacturing.

C. Illustrative Data Processing System

Figure 7:
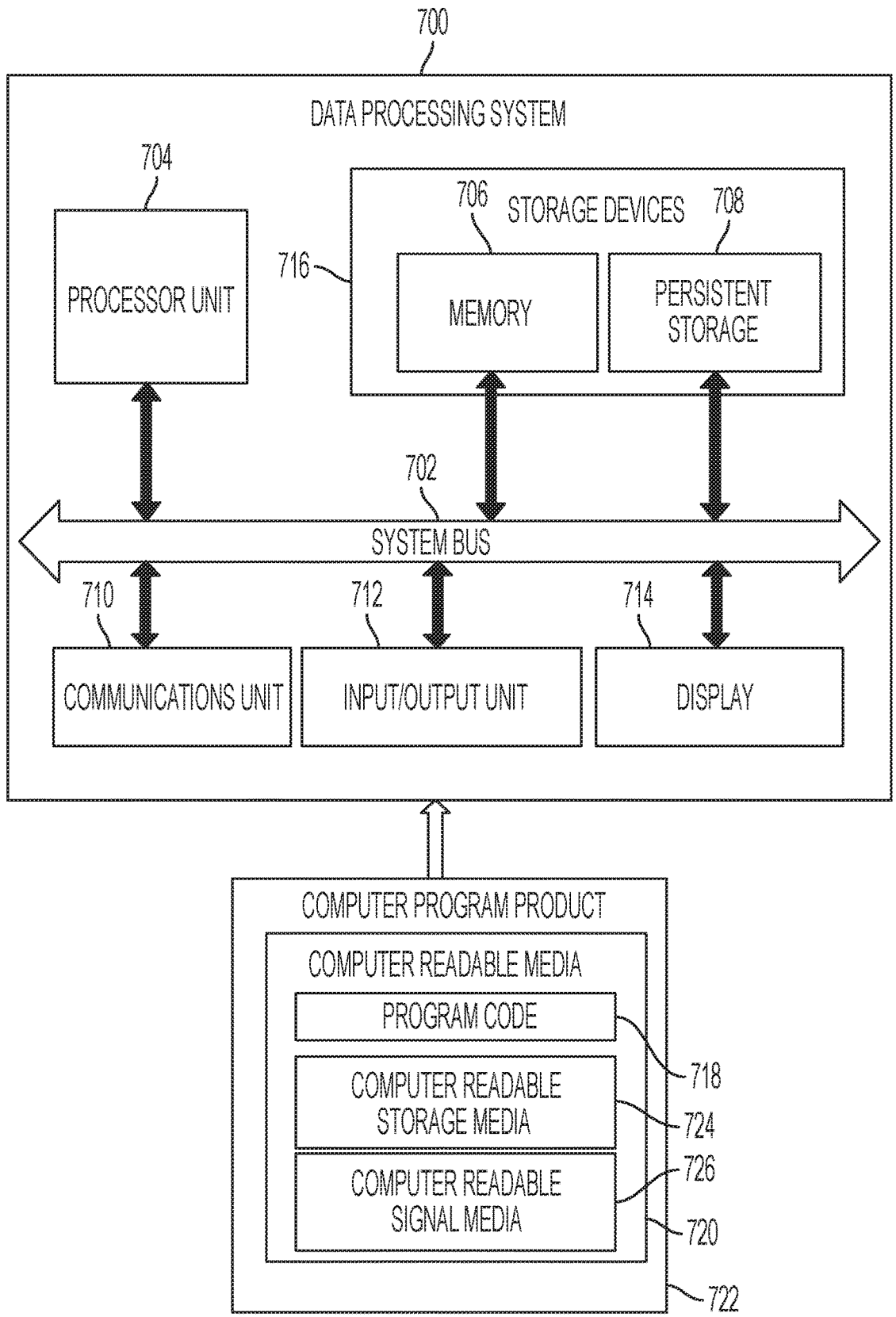
FIG. 7 is a schematic diagram of an illustrative data processing system.

As shown in FIG. 7, this example describes a data processing system 700 (also referred to as a computer, computing system, and/or computer system) in accordance with aspects of the present disclosure. Processor 112 and computer 212 described above are examples of data processing system 700. Data processing system 700 may be separate from and/or integrated with a scanning device such as scanning devices 110, 210, 310, or 410 as described above.

In this example, data processing system 700 is an illustrative data processing system suitable for implementing aspects of a method of detecting surface and near-surface porosity. More specifically, in some examples, devices that are examples of data processing systems (e.g., laptops, tablets, personal computers) may be used to receive and process data generated by an imaging device and/or light sensor, and to generate a map or image from the received data.

In this illustrative example, data processing system 700 includes a system bus 702 (also referred to as communications framework). System bus 702 may provide communications between a processor unit 704 (also referred to as a processor or processors), a memory 706, a persistent storage 708, a communications unit 710, an input/output (I/O) unit 712, and/or a display 714.

Processor unit 704 serves to run instructions that may be loaded into memory 706. Processor unit 704 may comprise a number of processors, a multi-processor core, and/or a particular type of processor or processors (e.g., a central processing unit (CPU), graphics processing unit (GPU), etc.), depending on the particular implementation. Further, processor unit 704 may be implemented using a number of heterogeneous processor systems in which a main processor is present with secondary processors on a single chip.

Memory 706 and persistent storage 708 are examples of storage devices 716. A storage device may include any suitable hardware capable of storing information (e.g., digital information), such as data, program code in functional form, and/or other suitable information, either on a temporary basis or a permanent basis. Storage devices 716 also may be referred to as computer-readable storage devices or computer-readable media.

Persistent storage 708 may contain one or more components or devices. For example, persistent storage 708 may include one or more devices such as a magnetic disk drive (also referred to as a hard disk drive or HDD), solid state disk (SSD), an optical disk drive such as a compact disk ROM device (CD-ROM), flash memory card, memory stick, and/or the like, or any combination of these. One or more of these devices may be removable and/or portable, e.g., a removable hard drive.

Input/output (I/O) unit 712 allows for input and output of data with other devices that may be connected to data processing system 700 (i.e., input devices and output devices). For example, an input device may include one or more pointing and/or information-input devices such as a keyboard, a mouse, touch screen, microphone, digital camera, and/or the like. These and other input devices may connect to processor unit 704 through system bus 702 via interface port(s) such as a serial port and/or a universal serial bus (USB).

Output devices may use some of the same types of ports, and in some cases the same actual ports, as the input device(s). For example, a USB port may be used to provide input to data processing system 700 and to output information from data processing system 700 to an output device. Some output devices (e.g., monitors, speakers, and printers, among others) may require special adapters. Display 714 may include any suitable human-machine interface or other mechanism configured to display information to a user, e.g., a CRT, LED, or LCD monitor or screen, etc.

Communications unit 710 refers to any suitable hardware and/or software employed to provide for communications with other data processing systems or devices. While communication unit 710 is shown inside data processing system 700, it may in some examples be at least partially external to data processing system 700. Communications unit 710 may include internal and external technologies, e.g., modems, ISDN adapters, and/or wired and wireless Ethernet cards, hubs, routers, etc. Data processing system 700 may operate in a networked environment, using logical connections to one or more remote computers.

Instructions for the operating system, applications, and/or programs may be located in storage devices 716, which are in communication with processor unit 704 through system bus 702. In these illustrative examples, the instructions are in a functional form in persistent storage 708. These instructions may be loaded into memory 706 for execution by processor unit 704. Processes of one or more examples of the present disclosure may be performed by processor unit 704 using computer-implemented instructions, which may be located in a memory, such as memory 706.

These instructions are referred to as program instructions, program code, computer usable program code, or computer-readable program code executed by a processor in processor unit 704. The program code in the different examples may be embodied on different physical or computer-readable storage media, such as memory 706 or persistent storage 708. Program code 718 may be located in a functional form on computer-readable media 720 that is selectively removable and may be loaded onto or transferred to data processing system 700 for execution by processor unit 704. Program code 718 and computer-readable media 720 form computer program product 722 in these examples. In one example, computer-readable media 720 may comprise computer-readable storage media 724 or computer-readable signal media 726.

The different components illustrated for data processing system 700 are not meant to provide architectural limitations to the manner in which different examples may be implemented. One or more examples of the present disclosure may be implemented in a data processing system that includes fewer components or includes components in addition to and/or in place of those illustrated for computer 700. Other components shown in FIG. 7 can be varied from the examples depicted. Different examples may be implemented using any hardware device or system capable of running program code.

In some examples, processor unit 704 may take the form of a hardware unit having hardware circuits that are specifically manufactured or configured for a particular use, or to produce a particular outcome or progress. This type of hardware may perform operations without needing program code 718 to be loaded into a memory from a storage device to be configured to perform the operations. For example, processor unit 704 may be a circuit system, an application specific integrated circuit (ASIC), a programmable logic device, or some other suitable type of hardware configured (e.g., preconfigured or reconfigured) to perform a number of operations.

D. Illustrative Method of Detecting Porosity

Figure 8:
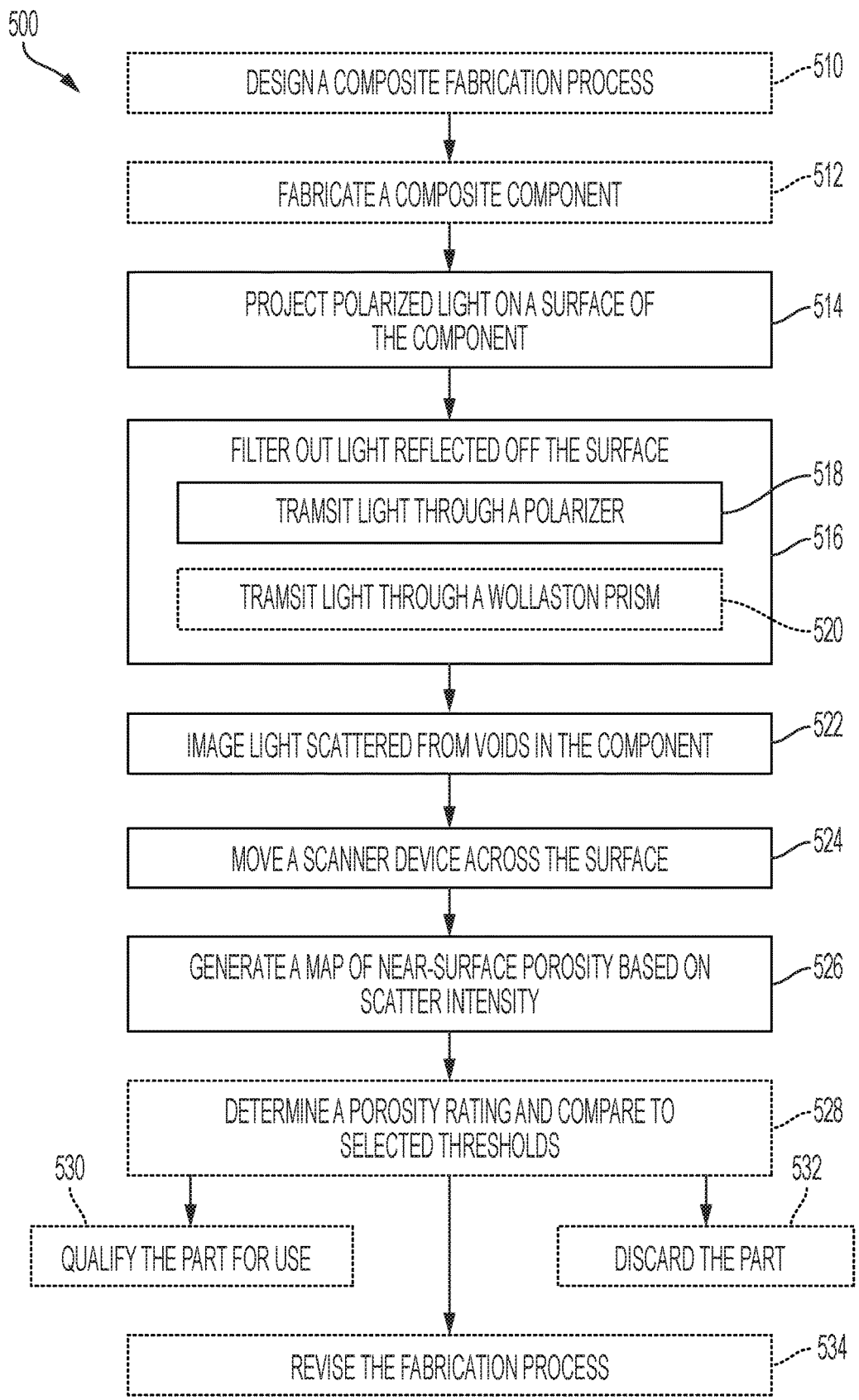
FIG. 8 is a flow chart depicting steps of an illustrative method for detecting surface and near-surface porosity in a composite component, according to the present teachings.

This section describes steps of an illustrative method 500 of detecting surface and near-surface porosity in a composite component; see FIG. 8. Aspects of scanner devices, scanning systems, and/or data processing systems described above may be utilized in the method steps described below. Where appropriate, reference may be made to components and systems that may be used in carrying out each step. These references are for illustration, and are not intended to limit the possible ways of carrying out any particular step of the method.

FIG. 8 is a flowchart illustrating steps performed in an illustrative method, and may not recite the complete process or all steps of the method. Although various steps of method 500 are described below and depicted in FIG. 8, the steps need not necessarily all be performed, and in some cases may be performed simultaneously or in a different order than the order shown.

At step 510, method 500 includes designing a composite fabrication process. The process may include impregnating a reinforcing material such as a fiber mesh or fabric with a matrix material such as a resin or epoxy. In some examples, the process may further include stacking multiple layers of the impregnated material, which may also be described as laying of multiple plies of pre-preg. The process may include forming the combined material into a desired shape, for instance by using a mold or tooling. The process may further include curing the matrix material under heat and/or pressure. For example, the material may be cured in an autoclave or using an out of autoclave (OOA) technique.

Designing the process may include specifying details of the process such as the matrix material used, storage conditions of the prepreg, the number of plies layered, and/or the heat, pressure and time profiles of the autoclave curing process. Designing the process may include adding or removing steps such as vacuum debulking, heating, or resting to allow infiltration. The process may be designed for fabrication of a single component, a line of related components, and/or any components comprised of a similar material.

Step 512 of the method includes fabricating a composite component according to the fabrication process designed in step 510. Steps 510 and 512 are optional, and method 500 may be begun at step 514 by providing a composite component. The composite component produced or provided may be any component for which porosity inspection is desired. Step 514 may be begun after curing and before post-processing or assembly of the composite component.

Method 500 may be particularly useful for primary or critical structures in which structural properties and performance are important. For example, in an aircraft, windows, flanges, corners, and joints may be inspected according to method 500, while face sheets of honeycomb panels may not require inspection. Alternatively or additionally, method 500 may be used with a test component configured to facilitate repeated fabrication and inspection. For example, a test component may have a simple geometry that is quickly and easily formed, and/or may have a planar surface providing ideal conditions for inspection. Such a component may facilitate repetition of method 500 to achieve an improved fabrication method.

Step 514 includes projecting polarized light on a surface of the component. The light projected may have a wavelength or wavelength distribution including a maximum or high transmission wavelength of the matrix material of the composite component. The wavelength and/or intensity of the light may be selected to achieve a desired penetration of the light into a near-surface region of the component. The near-surface region may include a first ply of a composite laminate, a few millimeters of matrix material, and/or any desired region proximate the surface.

The projected light may be produced by a polarized light source and/or passed through a polarizing filter. The incident light and surface of the component may define a plane of incidence, and the light may be p-polarized relative to the defined plane. In other words, the incident light may have an electric field parallel to the plane of incidence.

In some examples, step 514 may include projecting unpolarized or circularly polarized light on the surface of the component. Use of unpolarized light may allow a less expensive light source or more intensity of incident light. However, due to roughness of the surface or imperfections in optical components such as downstream polarizing filters, use of unpolarized light may lead to increased imaging of unwanted reflected light, as discussed in reference to step 516 below.

Step 514 may include projecting light on the surface of the component at Brewster's angle. That is, the light may be incident on the surface at the angle at which only s-polarized light, or light having an electric field perpendicular to the plane of incidence, is reflected off of the surface. The angle may be determined according to the material of the surface and the surrounding environment, as discussed in Example A, above.

For a smooth surface and a coherent light source, light may be projected at precisely Brewster's angle. However, an exact angle for all light projected on the surface may not be achievable, particularly for irregular surfaces or low-coherence light sources. Acceptable deviation may be determined according to desired scan quality, and equipment and/or procedures used to perform steps 514-526 may be selected accordingly. For example, a more coherent light source may be selected and/or a scan speed may be decreased.

Step 516 includes filtering out light reflected off the surface. The light projected onto the surface in step 514 may be partly absorbed by the composite component, and partly returned by reflection and/or scattering. More specifically, some portion of the light may be reflected off the surface, and some portion may be transmitted into the component. Of the transmitted light, some light may be absorbed, and some light may be scattered off of inhomogeneities in the component such as bubbles or voids in the matrix material, density discontinuities, or trapped foreign particles. The returned light is filtered to isolate the light scattered off of inhomogeneities by eliminating the surface reflection.

Filtering may be achieved according to sub-step 518, and optionally sub-step 520. Sub-step 518 includes transmitting the returned light through a polarizer. The polarizer may be configured to filter out s-polarized light. As a result of projecting light on the surface of the component at Brewster's angle in step 514, only the reflected light may be s-polarized. Indeed, in theory, because the light projected in step 514 is p-polarized and is incident at Brewster's angle, no light may be reflected from the surface and therefore step 516 may be unnecessary. However, due to curvature or roughness of the surface, variability in optical components, and other practical considerations, some reflection may occur and filtering may be required.

Light scattered from the inhomogeneities may be a majority p-polarized, as resulting from the transmitted p-polarized component of the incident light, and may therefore be largely unaffected by the polarizing filter. Filtering may be particularly important if the light projected in step 514 is not polarized, as noted above. In such a case, a full s-polarized reflection may be returned and thorough filtering may be required. Any unfiltered reflected light may be imaged with the light scattered from inhomogeneities in step 522, reducing clarity of the inhomogeneities in the image.

Sub-step 520 includes transmitting the light through a Wollaston prism, to further filter out s-polarized light. In some examples, the Wollaston prism may be used in conjunction with mirrors or other optical components to redirect light split by the prism. The Wollaston prism may function as a backup or redundancy to the polarizer, to further eliminate surface reflection. In some examples, sub-step 520 may additionally or alternatively include use of another polarizer and/or another type of filter.

Step 522 includes imaging light scattered from voids in the component. All inhomogeneities in the component which scatter the projected wavelength or wavelengths of light may also be imaged. Intensity of projected light and/or other parameters may be selected to avoid imaging reinforcement material at a lower end of the near-surface region of the component.

Imaging may be performed with any effective imaging device. For instance, an objective lens and a light sensor may be integrated with the polarizing filter used in step 518. The lens may focus an image of the surface and near-surface region of the component on to the light sensor, which may transmit the image data to a connected computer or other data processing system. In some examples, a commercially available digital camera may be used.

Step 524 includes moving a scanner device across the surface of the component. The scanner device may include the light source used in step 514 and the imaging device used in step 522. As the scanner device is moved across the surface, steps 514-522 may be performed continually and/or repeatedly, such that each area of the surface is imaged. The scanner device may be moved in a series of parallel lines over the surface, generating a plurality of image strips.

Step 524 may be performed manually and/or by an automated system. For example, an operator may pass a hand-held scanner device over the surface of the component. For another example, a robotic arm with the scanner device attached may be programmed to automatically scan the surface of the component. For another example, an initial scan may be performed by a robotic arm with the scanner device attached, and then a user may perform a follow-up scan or scans with a separate hand-held device or by detaching the scanner device from the robotic arm.

Throughout step 524, a constant standoff distance may be maintained between the scanner device and the surface. The standoff distance may be maintained by any effective structure or procedure. For example, the scanner may include wheels configured to roll across the surface, a laser distance sensor may provide feedback allowing a user to manually maintain a standoff distance, and/or a robotic arm may be programmed to move along a path on which the scanner device remains at a constant standoff distance.

Step 524 may include moving the scanner device across a portion of the surface of the component, across all surface areas of the component, and/or any areas of interest of the component. For example, component structures expected to experience significant stress or strain during use may be scanned while decorative regions of the component may not be scanned.

Step 524 may be performed as part of another scanning or testing operation. For example, the scanning device may be mounted to a robotic arm used for ultrasonic porosity testing. Step 524 may be performed according to testing standards or protocols. For example, the scanning device may be moved at a selected speed over the surface. For another example, the scanning device may be moved repeatedly over a particular area of the surface until desired scan resolution is achieved.

Step 524 may include recording positional data with an encoder wheel, rotary encoder, or other effective mechanism. The positional data may be referenced to the collected image data, to facilitate step 526.

Step 526 includes generating a map of surface and near-surface porosity based on scatter intensity. The image data collected in step 522 may be combined, or stitched together, according to image processing methods know to those skilled in the art. Image processing may be performed by a data processing system in communication with the scanner device and/or data from the scanner device may be stored in a computer readable medium for analysis by any desired data processing device. The generated map may be a scalar field of light intensity, with regions of greater intensity corresponding to inhomogeneities in the matrix material of the component.

The generated map may be reviewed by a user, or may further image processing may be performed to analyze the map. For example, optional step 528 includes determining a porosity rating and comparing the determined rating to selected thresholds. An average intensity, greatest intensity, percentage of map area with intensity over a selected value, or any desired quantitative measure may be used to determine the porosity rating. The thresholds may be selected according to porosity standards for the component. For example, a threshold may be selected that corresponds to a porosity above which a risk of surface cracking exists In a more specific example, a threshold analysis may be used to form a grayscale image from the intensity data to create a binary image allowing pixel counting to quantify the total presence of porosity. A percentage of porosity above two percent in a selected area may be designated a flaw.

Analysis of the intensity data and/or map may be performed such that existing porosity standards may be applied. For example, area averaging of intensity may be correlated to existing porosity standards. More specifically, reflection areas above a threshold per scan area may be correlated to known porosity percentage reference standards. For more detailed analysis, intensity histograms and/or area size-intensity counting may be used to quantify the data and predict larger or potential flaws.

In some examples, method 500 may include calibration using of a set of composite laminate reference materials created with a range of measured and documented porosity. Similarly to reference standards used for ultrasonic porosity testing, scatter intensity versus porosity curves for these reference materials may be used in system certification and qualification, as well as in analysis of collected intensity data. For each material type, a dedicated calibration standard may be used to adjust parameters such as lighting and image processing thresholds.

Further action may be performed according to results of the analysis of the map generated in step 526 and/or the porosity rating determined in step 528. For example, the results of the analysis may be used for quality control of the part. Optional step 530 includes qualifying the part for use, in response to determining an acceptable porosity rating. Optional step 532 includes discarding the part, in response to determining an unacceptable porosity rating. Other remediation options may be available also, including application of a corrective surface coating. In such an example, method 500 may be performed for each part produced at a manufacturing facility.

For another example, the results may be used to evaluate the success of the fabrication process designed in step 510. Optional step 534 includes revising the fabrication process. For instance, a temperature choice made in step 510 may result in increased porosity rating and the temperature may be revised in step 534. In such an example, method 500 may be performed repeatedly until a consistently effective fabrication process has been developed, a problem in fabrication has been resolved, or efficiency of the fabrication process has been improved, for example.

Illustrative Combinations and Additional Examples

This section describes additional aspects and features of systems and methods for detecting of surface and near-surface porosity in composite components, presented without limitation as a series of paragraphs, some or all of which may be alphanumerically designated for clarity and efficiency. Each of these paragraphs can be combined with one or more other paragraphs, and/or with disclosure from elsewhere in this application, in any suitable manner. Some of the paragraphs below expressly refer to and further limit other paragraphs, providing without limitation examples of some of the suitable combinations.

A0. A method of detecting porosity at and near a composite surface, comprising:

projecting polarized light on a surface of a composite component, filtering out light reflected off of the surface, imaging light scattered from inhomogeneities in the composite component, and generating a map of absence of composite material near the composite surface based on scatter intensity detected in the imaging step.

A1. The method of A0, wherein the projecting step uses an illumination source directed at the composite surface at an angle of less than ninety degrees relative to a line normal to the composite surface, such that a single polarization component of the light is reflected with an electric field parallel to the surface.

A2. The method of A1, wherein a light path from the illumination source to the surface forms Brewster's angle.

A3. The method of A2, wherein the imaging step is performed with a camera system.

A4. The method of A3, wherein all optical components of the illumination source and camera system are coated with a narrow bandpass antireflection filter allowing a limited range of wavelength transmission.

A5. The method of any of A1-A4, further comprising:

selecting an illumination frequency that matches a maximum transmission frequency of the composite component.

A6. The method of any of A0-A5, wherein filtering out reflected light includes:

transmitting light through a polarizer prior to imaging.

A7. The method of A6, wherein filtering out reflected light further includes:

transmitting light through a Wollaston Prism prior to imaging.

A8. The method of any of A0-A7, wherein the projecting and imaging steps are carried out by a mobile scanning device configured to move across the composite surface.

A9. The method of A8, further comprising:

maintaining a substantially constant distance between the mobile scanning device and the composite surface during a scanning procedure.

A10. The method of A9, further comprising, imaging light scattered from reinforcing fibers of the composite component, below a near-surface region of the composite component.

A11. The method of any of A0-A10, wherein projecting polarized light includes projecting light from an unpolarized source through a polarizer.

A12. The method of any of A0-A11, further comprising detecting porosity of the composite component distant from the surface with an ultrasonic scanner.

B0. A system for detecting porosity in a composite component, comprising: an illumination source configured to project polarized light on a surface of a composite component at Brewster's angle, an imaging device configured to receive a scatter of light from a sub-surface region of the composite component, and a processor configured to generate a map of inhomogeneities in the composite component based on scatter intensity detected by the imaging device.

B1. The system of B0, wherein the illumination source and the imaging device are included in a mobile scanning device.

B2. The system of B1, wherein the mobile scanning device is self-propelled.

B3. The system of B1 or B2, wherein the mobile scanning device includes a robotic arm.

B4. The system of any of B0-B3, wherein the system further includes an ultrasonic transducer.

B5. The system of any of B0-B4, wherein the imaging device includes a camera system.

B6. The system of any of B0-B5, wherein the imaging device includes a polarizer configured to filter out light reflected with an electric field parallel to the surface of the composite component.

B7. The system of any of B0-B6, wherein the illumination source has a frequency that matches a maximum transmission frequency of the composite component.

B8. The system of B7, wherein the illumination source has a frequency matching a maximum transmission frequency of a matrix material of the composite component.

B9. The system of any of B0-B8, wherein the illumination source includes a light emitting diode and a polarizer.

B10. The system of any of B0-B9, wherein all optical components of the illumination source and imaging device are coated with a narrow bandpass antireflection filter.

C0. A method of detecting surface and near-surface porosity of a composite component, comprising:
   illuminating a surface of a composite component such that light is incident on the surface at Brewster's angle,
   receiving light from the composite component with a lens oriented at an angle matching the angle of incidence of the light,
   producing an image of a near-surface region of the composite component from the received light with a light sensor.

C1. The method of C0, wherein the incident light is polarized with an electric field parallel to a plane of incidence of the light on the surface.

C2. The method of C0 or C1, wherein the incident light is unpolarized.

C3. The method of any of C0-C2, further including filtering out light reflected from the surface of the workpiece.

C4. The method of any of C0-C3, further including filtering the received light with a polarizer, to filter out light with an electric field perpendicular to a plane of incidence of the light on the surface.

D0. A method of manufacturing a composite component, comprising:
   curing matrix material and a reinforcement material to form a composite component having a near-surface region;
   testing the near-surface region to determine a porosity rating, including:
      projecting polarized light on a surface of the composite component,
      filtering out light reflected off of the surface, and
      imaging light scattered from inhomogeneities in the near-surface region,
   in response to determining a porosity rating above a first selected threshold, discarding the composite component.

D1. The method of D0, further comprising:
   in response to determining a porosity rating below the first selected threshold and above a second selected threshold, treating the surface of the composite component; and
   re-testing the near-surface region to determine a revised porosity rating.

D2. The method of D1, wherein treating the surface of the composite component includes applying a sealant to the surface.

D3. The method of any of D0-D2, further comprising:
   in response to determining a porosity rating below a second selected threshold, qualifying the composite component for use.

E0. A method of improving a composite fabrication process, comprising:
   fabricating a first composite component according to a fabrication process;
   testing a near-surface porosity of the composite component, including:
      projecting polarized light on a surface of the composite component,
      filtering out light reflected off of the surface, and
      imaging light scattered from inhomogeneities in the near-surface region,
   revising the fabrication process; and
   fabricating a second composite component according to the revised fabrication process.

Advantages, Features, and Benefits

The different examples of the method for detecting porosity described herein provide several advantages over known solutions for addressing surface and near-surface porosity in composite components. For example, illustrative examples described herein allow rapid and automated imaging of surface and near-surface porosity.

Additionally, and among other benefits, illustrative examples described herein allow selective application of surface treatments based on detection of porosity instead of routine application to all surfaces and/or components.

Additionally, and among other benefits, illustrative examples described herein allow evaluation of the effect on surface and near-surface porosity of changes in a composite manufacturing method.

Additionally, and among other benefits, illustrative examples described herein allow quality control of composite components based on quantitative measurement of surface and near-surface porosity.

Additionally, and among other benefits, illustrative examples described herein allow analysis of surface and near-surface porosity patterns and trends in manufacture of composite components.

No known system or device can perform these functions, particularly in a rapid and efficient scanning method appropriate to large-scale components. Thus, the illustrative examples described herein are particularly useful for aircraft manufacture. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A method of detecting porosity at and near a composite surface, comprising:
   projecting polarized light on a surface of a composite component,
   filtering out light reflected off of the surface,
   imaging light scattered from inhomogeneities in the composite component, and
   generating a map of absence of composite material near the composite surface based on scatter intensity detected in the imaging step.

2. The method of claim 1, wherein the projecting step uses an illumination source, and a light path from the illumination source to the surface forms Brewster's angle.

3. The method of claim 1, wherein filtering out reflected light includes:
   transmitting light through a polarizer prior to imaging.

4. The method of claim 3, wherein filtering out reflected light further includes:
   transmitting light through a Wollaston Prism prior to imaging.

5. The method of claim 1, further comprising:
   selecting an illumination frequency that matches a maximum transmission frequency of the composite component.

6. The method of claim 1, wherein the projecting and imaging steps are carried out by a mobile scanning device configured to move across the composite surface.

7. The method of claim 6, further comprising:
   maintaining a substantially constant distance between the mobile scanning device and the composite surface during a scanning procedure.

8. The method of claim 1, further comprising,
   imaging light scattered from reinforcing fibers of the composite component, below a near-surface region of the composite component.

9. The method of claim 1, wherein projecting polarized light includes projecting light from an unpolarized source through a polarizer.

10. The method of claim 1, further comprising detecting porosity of the composite component distant from the surface with an ultrasonic scanner.

11. A system for detecting porosity in a composite component, comprising:
    an illumination source configured to project polarized light on a surface of a composite component at Brewster's angle,
    an imaging device configured to receive a scatter of light from a sub-surface region of the composite component, and
    a processor configured to generate a map of inhomogeneities in the composite component based on scatter intensity detected by the imaging device.

12. The system of claim 11, wherein the illumination source and the imaging device are included in a mobile scanning device.

13. The system of claim 12, wherein the mobile scanning device includes a robotic arm.

14. The system of claim 11, wherein the system further includes an ultrasonic transducer.

15. The system of claim 11, wherein the illumination source has a frequency matching a maximum transmission frequency of a matrix material of the composite component.

16. The system of claim 11, wherein the illumination source includes a light emitting diode and a polarizer.

17. The system of claim 11, wherein all optical components of the illumination source and imaging device are coated with a narrow bandpass antireflection filter.

18. A method of detecting surface and near-surface porosity of a composite component, comprising:
    illuminating a surface of a composite component such that light is incident on the surface at Brewster's angle,
    receiving light from the composite component with a lens oriented at an angle matching the angle of incidence of the light,
    producing an image of a near-surface region of the composite component from the received light with a light sensor.

19. The method of claim 18, wherein the incident light is polarized with an electric field parallel to a plane of incidence of the light on the surface.

20. The method of claim 18, further including filtering the received light with a polarizer, to filter out light with an electric field perpendicular to a plane of incidence of the light on the surface.

* * * * *